United States Patent [19]
Daughenbaugh et al.

[11] Patent Number: 5,973,093
[45] Date of Patent: Oct. 26, 1999

[54] POLYMERIZABLE POLYOL (ALLYL CARBONATE) COMPOSITION

[75] Inventors: Randy E. Daughenbaugh, Turtle Creek; Robert D. Herold, Monroeville; Charles R. Wiedrich; John C. Crano, both of Murrysville, all of Pa.

[73] Assignee: PPG Industries Ohio, Inc., Cleveland, Ohio

[21] Appl. No.: 08/757,206

[22] Filed: Nov. 27, 1996

[51] Int. Cl.$^6$ .............................. C08F 18/24; C08L 35/02; G03C 1/73
[52] U.S. Cl. .......................... 526/314; 252/586; 252/589; 430/495.1; 430/962; 526/260; 526/319; 526/323.1; 526/323.2; 526/328.5; 526/333
[58] Field of Search ................... 526/314–323.2, 526/323.1, 333, 260, 319; 252/586, 589; 430/495.1, 962

[56] References Cited

U.S. PATENT DOCUMENTS

| | | |
|---|---|---|
| 2,370,567 | 2/1945 | Muskat et al. |
| 2,403,113 | 7/1946 | Muskat et al. |
| 3,361,706 | 1/1968 | Meriwether et al. |
| 3,562,172 | 2/1971 | Ono et al. |
| 3,567,605 | 3/1971 | Becker . |
| 3,578,602 | 5/1971 | Ono et al. |
| 4,166,043 | 8/1979 | Uhlmann et al. |
| 4,215,010 | 7/1980 | Hovey et al. |
| 4,306,780 | 12/1981 | Tarumi et al. ............... 351/159 |
| 4,342,668 | 8/1982 | Hovey et al. ................ 252/586 |
| 4,367,170 | 1/1983 | Uhlmann et al. ............ 252/586 |
| 4,637,698 | 1/1987 | Kwak et al. ................. 351/163 |
| 4,816,584 | 3/1989 | Kwak et al. ................. 544/71 |
| 4,818,096 | 4/1989 | Heller et al. ................. 351/163 |
| 4,826,977 | 5/1989 | Heller et al. ................. 544/70 |
| 4,880,667 | 11/1989 | Welch ......................... 427/160 |
| 4,931,219 | 6/1990 | Kwiatkowski et al. ....... 252/586 |
| 4,931,220 | 6/1990 | Haynes et al. ............... 252/586 |
| 5,066,818 | 11/1991 | Van Germert et al. ....... 549/389 |
| 5,221,721 | 6/1993 | Selvig ......................... 526/193 |
| 5,238,931 | 8/1993 | Yoshikawa et al. .......... 514/184 |
| 5,274,132 | 12/1993 | Van Gemert ................. 549/389 |
| 5,384,077 | 1/1995 | Knowles ...................... 252/586 |
| 5,405,958 | 4/1995 | Van Gemert et al. ........ 544/71 |
| 5,429,774 | 7/1995 | Kumar ........................ 252/586 |
| 5,442,022 | 8/1995 | Keita et al. .................. 526/309 |
| 5,466,398 | 11/1995 | Van Gemert et al. ........ 252/586 |
| 5,545,828 | 8/1996 | Keita et al. .................. 526/72 |
| 5,556,931 | 9/1996 | Imura et al. ................. 526/323.1 |

FOREIGN PATENT DOCUMENTS

| | | |
|---|---|---|
| 62-195383 | 8/1987 | Japan . |
| WO 96/18926 | 6/1996 | WIPO . |
| WO 96/19741 | 6/1996 | WIPO . |
| WO96/340245 | 10/1996 | WIPO . |

OTHER PUBLICATIONS

*Techniques of Chemistry*, Photochromism, vol. 3, "Photochromic Processes Involving Heterolytic Cleavage", R. C. Bertelson, Chap. 3, pp. 48–55, pp. 252–254, pp 399, p 842, Wylie–Interscience.

*Primary Examiner*—Fred Zitomer
*Attorney, Agent, or Firm*—Irwin M. Stein; James R. Franks

[57] ABSTRACT

Describes polymerizable organic compositions of a major amount of a first monomer component which is a polyol (allyl carbonate), e.g., diethylene glycol bis(allyl carbonate), and from about 2 to 35 weight percent of a second monomer component which is an alkoxylated bisphenol (or hydrogenated bisphenol) having acrylate or methacrylate groups, e.g., dimethacrylate of bisphenol A having 25 to 35 ethoxy units. Substantially completely cured polymerizates prepared from such compositions may be used to prepare photochromic articles, e.g., lenses, by incorporating a photochromic substance, e.g., by thermal transfer, into the polymerizate.

22 Claims, No Drawings

POLYMERIZABLE POLYOL (ALLYL CARBONATE) COMPOSITION

DESCRIPTION OF THE INVENTION

The present invention relates to polymerizable organic compositions and polymerizates prepared therefrom, particularly polymerizates having organic photochromic substances applied to or incorporated therein. More particularly, the present invention relates to certain polymerizable organic compositions that contain a major amount of a polyol(allyl carbonate) first monomer component and a second monomer component having acrylate or methacrylate groups. Still more particularly, this invention relates to photochromic articles prepared from polymerizates of such polymerizable organic compositions. Photochromic articles prepared in accordance with the present invention have been observed to exhibit an improved photochromic response.

Polymerizable organic compositions based on polyol (allyl carbonate), particularly diethylene glycol bis(allyl carbonate), and polymerizates obtained therefrom are well known in the art. Polymerizates of polymerizable organic compositions based on homopolymers of diethylene glycol bis(allyl carbonate) possess excellent clarity, good flexibility and abrasion resistance. However, when cured substantially completely, it is difficult to incorporate organic photochromic substances into such polymerizates by diffusion.

Photochromism is a phenomenon involving a change in color of a photochromic substance, or an article containing such a substance, upon exposure to light radiation containing ultraviolet rays, such as ultraviolet radiation contained in sunlight or in the light of a mercury lamp, and a reversion to the original color when the influence of the ultraviolet radiation is discontinued. Discontinuation of the ultraviolet radiation can be achieved for example by storing the photochromic substance or article in the dark or by removing the source of ultraviolet radiation. Recently, photochromic plastic materials, particularly plastic materials for optical applications, have been the subject of considerable attention. In particular, photochromic ophthalmic plastic lenses have been investigated in part due to the weight advantage that they can offer relative to ophthalmic lenses made of glass. In addition, photochromic transparencies for vehicles, such as automobiles and airplanes, have been of interest because of the potential safety features that such transparencies offer.

Fully cured polymerizates based on homopolymers of polyol(allyl carbonate), for example diethylene glycol bis (allyl carbonate), are not particularly well suited to having organic photochromic substances incorporated therein by diffusion. Consequently, a homopolymer of polyol(allyl carbonate) is often initially undercured prior to having the organic photochromic substance incorporated therein by diffusion, followed by an additional curing step to fully cure the polymer. Such a two-stage cure process requires extra time and expense.

U.S. Pat. No. 5,556,931 discloses polymerizable compositions comprising at least two ethoxylated bisphenol A dimethacrylate type monomers. The composition is described as having 30 to 80 mole % of a monomer having 2 to 3 ethoxy units, 20 to 50 mole % of a monomer having 6 to 12 ethoxy units, and less than 20 mole % of a monomer having other than 2 to 3 and 6 to 12 ethoxy units. U.S. Pat. No. 5,545,828 discloses organic ophthalmic lenses prepared from the polymerization of a composition comprising at least 50% by weight of an ethoxylated bisphenol A dimethacrylate type monomer having 0 to 10 ethoxy units. U.S. Pat. No. 5,442,022 discloses a polymerizate obtained by the polymerization of a polymerisable composition comprising, in part, at least 50% by weight of an ethoxylated bisphenol A dimethacrylate type monomer, or mixture of such monomers, having 0 to 10 ethoxy units.

International patent publication WO 96/19741 discloses organic photochromic materials consisting of a polymer matrix of optical quality and of at least one dye that imparts photochromic properties to the matrix. The polymer constituting the matrix may be a copolymer of 30 to 95 weight % ethoxylated bisphenol A dimethacrylate having 2 to 4 ethoxy units, and 5 to 70 weight % of a polyurethane oligomer having terminal di- or triacrylic or di- or trimethacrylic functionality. International patent publication WO 96/18926 discloses photochromic transparent organic materials particularly useful for the production of photochromic organic ophthalmic lenses. The organic materials are chosen from homopolymers of ethoxylated bisphenol A dimethacrylate having 2 to 4 ethoxy units, and copolymers of such dimethacrylates, and at most 30 weight % of an aromatic monomer with vinyl, acrylic or methacrylic functionality. The above patents and patent applications do not disclose ethoxylated bisphenol A dimethacrylate type monomers in combination with polyol(allyl carbonate) type monomers.

U.S. Pat. No. 4,306,780 discloses a high refractive index lens obtained by copolymerization of an ethoxylated bisphenol A dimethacrylate type monomer having 0 to 8 ethoxy units. Example 14 of U.S. Pat. No. 4,306,780 discloses the combination of bisphenol A dimethacrylate (BPDMA) with phenylmethacrylate and CR-39© diethylene glycol bis(allyl carbonate) monomer.

It has now been discovered that substantially completely cured polymerizates prepared from polymerizable organic compositions of the present invention show essentially no loss in physical properties, such as flexibility and abrasion resistance, compared to polymerizates obtained from homopolymers of diethylene glycol bis(allyl carbonate). It has further been discovered that photochromic articles prepared from polymerizates made in accordance with the present invention have an improved photochromic response compared to photochromic articles prepared from homopolymers of diethylene glycol bis(allyl carbonate).

Polymerizable organic compositions according to the present invention are comprised of a major amount of a first monomer component, which is represented by the following general formula I,

$$R\!-\!\!\left[\!-\!O\!-\!C(O)\!-\!O\!-\!R_1\right]_i \qquad \qquad I$$

wherein R is a radical derived from a polyol, $R_1$ is a radical derived from a substituted or unsubstituted allyl group and i is a whole number from 2 to 6, preferably 2 to 3, more preferably 2, and from 2% to 35% by weight, based on the total weight of monomer components, of a second monomer component, which is represented by the following general formula II,

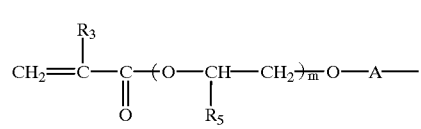

$$\text{II}$$

-continued

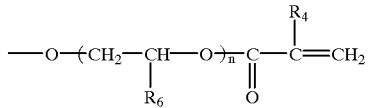

wherein m and n are each a positive number, the sum of m and n being from 5 to 70, $R_3$ and $R_4$ are each hydrogen or methyl, $R_5$ and $R_6$ are each hydrogen or $C_1$ to $C_2$ alkyl, preferably hydrogen or methyl and A is a divalent linking group selected from the group consisting of straight or branched chain alkylene (usually containing from 1 to 8 carbon atoms), phenylene, $C_1$–$C_9$ alkyl substituted phenylene and a group represented by the following general formula III,

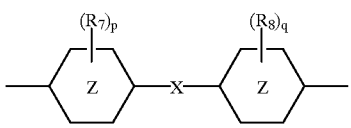

wherein $R_7$ and $R_8$ are each $C_1$–$C_4$ alkyl, chlorine or bromine, p and q are each an integer from 0 to 4,

represents a divalent benzene group or a divalent cyclohexane group, and X is O, S, —S($O_2$)—, —C(O)—, —$CH_2$—, —CH=CH—, —C($CH_3$)$_2$—, —C($CH_3$)($C_6H_5$)— or

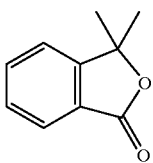

when

is the divalent benzene group, and X is O, S, —$CH_2$—, or —C($CH_3$)$_2$— when

is the divalent cyclohexane group.

Optionally from 0.5% to 30% by weight, based on the total weight of monomer components, of a third monomer component, having ethylenic unsaturation and being polymerizable by free radical initiation, may also be present in the polymerizable organic compositions of the present invention. The third monomer component is different from the first and second monomer components.

As used herein with regard to e and f, and m and n, unless otherwise stated, "number" is meant to mean "average number". Other than in the operating examples, or where otherwise indicated, all numbers expressing quantities of ingredients or reaction conditions used herein are to be understood as modified in all instances by the term "about".

DETAILED DESCRIPTION OF THE INVENTION

In accordance with the present invention, there are provided certain polymerizable organic compositions comprising a major amount of a first monomer component, as defined above with respect to general formula I. The first monomer component may be described as being a polyol (allyl carbonate). Polyol(allyl carbonate) monomers that may be used in the aforedescribed polymerizable organic composition are allyl carbonates of linear or branched aliphatic or aromatic polyols, e.g., aliphatic glycol bis(allyl carbonate) compounds and alkylidene bisphenol bis(allyl carbonate) compounds. These monomers may be described as unsaturated polycarbonates of polyols, e.g., glycols. The first monomer component may be prepared by procedures well known in the art, e.g., as described in U.S. Pat. Nos. 2,370,567 and 2,403,113.

In reference to general formula I, $R_1$ is a radical derived from an allyl group which may be substituted at the 2-position with a halogen, most notably chlorine or bromine, or an alkyl group containing from 1 to 4, e.g., 1 to 2, carbon atoms. Generally, the alkyl substituent is methyl or ethyl. The $R_1$ radical may be represented by the following general formula IV:

$$H_2C=C(R_2)-CH_2- \qquad IV$$

wherein $R_2$ is hydrogen, halogen or a $C_1$ to $C_4$ alkyl group. Most commonly, $R_2$ is hydrogen and consequently $R_1$ is the unsubstituted allyl group, $H_2C=CH-CH_2-$.

In reference to general formula I, R is a polyvalent radical derived from a polyol which can be an aliphatic, cycloaliphatic or an aromatic polyol containing 2, 3, 4, 5 or 6 hydroxy groups. Typically, the polyol contains 2 hydroxy groups, i.e., a glycol or bisphenol. The aliphatic polyol may be linear or branched and contain from 2 to 10 carbon atoms. Commonly, the aliphatic polyol is an alkylene glycol having from 2 to 4 carbons atoms, ethylene glycol, propylene glycol, trimethylene glycol, tetramethylene glycol, or a poly($C_2$–$C_4$) alkylene glycol, e.g., diethylene glycol, triethylene glycol, etc. Other useful polyols include aromatic polyols, such as bisphenols, e.g., 4,4'-isopropylidenediphenol, and cycloaliphatic polyols, such as biscyclohexanols, e.g., 4,4'-isopropylidenebiscyclohexanol.

Specific examples of polyol(allyl carbonate) monomers that may be used as the first monomer component include: ethylene glycol bis(2-chloroallyl carbonate), ethylene glycol bis(allyl carbonate), diethylene glycol bis(2-methylallyl carbonate), diethylene glycol bis(allyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4 butanediol bis(2-bromoallyl carbonate), dipropylene glycol bis(allyl carbonate), trimethylene glycol bis(2-ethylallyl carbonate), pentamethylene glycol bis(allyl carbonate), 4,4'-isopropylidenediphenol bis(allyl carbonate), and 4,4'-isopropylidenebiscyclohexanol bis(allyl carbonate). The preferred polyol(allyl carbonate) monomer is diethylene glycol bis(allyl carbonate).

A detailed description of polyol(allyl carbonate) monomers that may be used to prepare the first monomer component of the composition of the present invention is found in U.S. Pat. No. 4,637,698 at column 3, line 33 through column 5, line 61. That disclosure is hereby incorporated by reference and is summarized above. As used in the present description with reference to the first monomer component, the term polyol(allyl carbonate) monomer or like names, e.g., diethylene glycol bis(allyl carbonate), is intended to mean and include the named monomers or prepolymers thereof and any related monomer or oligomer species contained therein.

The polymerizable organic composition of the present invention contains also a second monomer component as defined with reference to general formula II. Typically, the second monomer component is present in an amount of from 2% to 35%, preferably from 2% to 25% and more preferably from 2% to 15% by weight, based on the total weight of monomer components.

A particularly preferred second monomer component can be defined with reference to general formula II, wherein the sum of m and n is from 15 to 40, e.g., .25 to 35, $R_3$ and $R_4$ are each methyl, $R_5$ and $R_6$ are each hydrogen, and A is a divalent linking group according to general formula III wherein

represents a divalent benzene group, p and q are each 0, and X is —$C(CH_3)_2$—.

The second monomer component may be prepared by methods which are well known in the art. One such commonly used method involves a two-step process. In the first step, a polyol, e.g., 4,4'-isopropylidenediphenol, is reacted with an oxirane containing substance, for example ethylene oxide, propylene oxide, α-butylene oxide or β-butylene oxide, to form what is commonly referred to as an ethoxylated, propoxylated or butoxylated polyol having hydroxy functionality. In the second step, the ethoxylated, propoxylated or butoxylated polyol is esterified, or transesterified, with an alpha–beta unsaturated acid or ester such as methacrylic acid, an alkyl methacrylate, an acrylic acid, an alkyl acrylate, or a combination thereof. The second step-results in the formation of the second monomer component.

Examples of polyols suitable for use in the first step of preparing the second monomer component include: straight chain alkylene glycols such as ethylene glycol, propylene glycol, trimethylene glycol, tetramethylene glycol, or diethylene glycol, triethylene glycol; branched chain alkylene glycols such as 1,2-propanediol, 2-methyl-1,3-propanediol, 1,2-butanediol, 1,3-butanediol, 2,3-butanediol; phenylene diols such as ortho, meta and para dihydroxy benzene; alkyl substituted phenylene diols such as 2,6-dihydroxytoluene, 3-methylcatechol, 4-methylcatechol, 2-hydroxybenzyl alcohol, 3-hydroxybenzyl alcohol, and 4-hydroxybenzyl alcohol; dihydroxybiphenyls such as 4,4'-dihydroxybiphenyl and 2,2'-dihydroxybiphenyl; bisphenols such as 4,4'-isopropylidenediphenol; 4,4'-oxybisphenol; 4,4'-dihydroxybenzenephenone; 4,4'-thiobisphenol; phenolphthlalein; bis(4-hydroxyphenyl)methane; 4,4'-(1,2-ethenediyl)bisphenol; and 4,4'-sulfonylbisphenol; halogenated bisphenols such as 4,4'-isopropylidenebis(2,6-dibromophenol), 4,4'-isopropylidenebis(2,6-dichlorophenol) and 4,4'-isopropylidenebis(2,3,5,6-tetrachlorophenol); and biscyclohexanols, which can be prepared by hydrogenating the corresponding bisphenols, such as 4,4'-isopropylidenebiscyclohexanol; 4,4'-oxybiscyclohexanol; 4,4'-thiobiscyclohexanol; and bis(4-hydroxycyclohexanol)methane In a particularly preferred embodiment of the present invention, the polymerizable organic composition comprises di(ethylene glycol) bis(allyl carbonate) as the first monomer component and from 2% to 15% by weight, based on the total weight of monomer components, of a second monomer component, which is defined in reference to general formula II, wherein the sum of m and n is from 25 to 35, e.g., 30, $R_3$ and $R_4$ are each methyl, $R_5$ and $R_6$ are each hydrogen, and A is a divalent linking group according to general formula III wherein

represents a divalent benzene group, p and q are each 0, and X is —$C(CH_3)_2$—.

Optionally, from 0.5% to 30% by weight, based on the total weight of monomer components, of a third monomer component may also be present in the polymerizable organic composition of the present invention. The third monomer component is different than the first and second monomer components, has ethylenic unsaturation, and is polymerizable by free radical initiation.

The third monomer component may be added to the polymerizable composition for example, to enhance the hardness of polymerizates prepared from the polymerizable organic compositions of the present invention. As used herein, "ethylenic unsaturation" is meant to include allylic unsaturation, alpha–beta ethylenic unsaturation, and vinyl unsaturation. The third monomer component may preferably represent from 0.5% to 20% and more preferably from 0.5% to 10% by weight of the polymerizable composition, based on total weight of monomer components. The third monomer component may have more than one ethylenic unsaturated group which is polymerizable by free radical initiation.

Examples of suitable monomers which may be used as the third monomer component include: acrylic acid, methacrylic acid, esters of acrylic acid such as methyl acrylate and 2-hydroxyethyl acrylate, esters of methacrylic acid, such as methyl methacrylate, 2-hydroxyethyl methacrylate and phenoxyethyl methacrylate, and vinyl esters such as vinyl acetate. Examples of suitable monomers, having more than one free radical polymerizable group, which may be used as the third monomer component include: allyl methacrylate, ethyleneglycol dimethacrylate, triallyl cyanurate, pentaerythritol tetraacrylate, di-pentaerythritoltriacrylate, di-pentaerythritolpentaacrylate, ethoxylated trimethylolpropane triacrylate having 0 to 20 ethoxy units, ethoxylated trimethylolpropane trimethacrylate having 0 to 20 ethoxy units and ethylenically-terminated aliphatic polyurethane monomers. By "aliphatic polyurethane monomers" is meant polyurethane monomers which are substantially free of carbamic nitrogen groups attached directly to aromatic groups. A particularly preferred third monomer component is vinyl acetate.

Aliphatic polyurethane monomers contemplated for use as the third monomer component include those having terminal unsaturated groups selected from acrylyl, methacrylyl and allyl groups, and mixtures of such unsaturated groups. More particularly, ethylenically-terminated aliphatic polyurethane monomers contemplated include bis(allyl-terminated) aliphatic polyurethane monomers, mono(allyl-terminated)—mono(acrylyl-terminated) aliphatic polyurethane monomers, bis(acrylyl-terminated) aliphatic polyurethane monomers, and mixtures of such aliphatic polyurethane monomers. Bis(ethylenically-terminated) aliphatic polyesterurethane monomers and bis(ethylenically-terminated) aliphatic polyetherurethane monomers are also contemplated.

The aforedescribed aliphatic polyurethane monomers may be represented by the general formulae, V-1, V-2 and V-3:

| D—B—Y—B—D. | V-1 |
| D—B—Y—B—D' | V-2 |
| D'—B—Y—B—D' | V-3 | wherein D represents the terminal functional group containing allyl unsaturation, D' represents the terminal functional group containing acrylyl unsaturation, Y represents the residue of a saturated aliphatic polyol, and B represents an aliphatic bis carbamic moiety that originated from the corresponding aliphatic diisocyanate. Group B in the foregoing graphic expressions may be represented herein by the formula, —OC(O)—NH(E)NH—C(O)O—, wherein E is the aliphatic (including cycloaliphatic) residue of the aliphatic diisocyanate.

The group Y may be a diol, such as a $C_2$-$C_6$ alkane diol, diethylene glycol, a polyether diol, a polycarbonate diol or a polyester diol, i.e., the residue remaining after removal of the hydroxyl groups from the polyol, e.g., diol. For example, when the polyol is butane diol, Y in the foregoing graphic expressions may be represented by the formula, —$CH_2$—$CH_2$—$CH_2$—$CH_2$— (or —$(CH_2)_4$—). Preferably, Y is the residue of a polyester diol, diethylene glycol, or $C_2$-$C_6$, e.g., $C_2$-$C_4$, alkane diol, e.g., butane diol, and is liquid at room temperature.

The terminal group D in the foregoing expressions contains allyl unsaturation, and is preferably the allyl group, i.e., $CH_2$=CH—$CH_2$—, which originates, for example, from allyl alcohol. The terminal group D' in the foregoing expressions, which contains acrylyl unsaturation, may be acrylyl or methacrylyl unsaturation, i.e., $CH_2$=CH(L)—C(O)—, wherein L is hydrogen or methyl. The terminal group D' may also be represented by the expression $CH_2$=C(L)—C(O)—O—M—, wherein M is an alkylene group of from 2 to 6 carbon atoms, such as ethylene, and L is hydrogen or methyl, e.g., the group derived from 2-hydroxyethyl acrylate or methacrylate. The term "acrylyl", as used herein is intended to include "methacrylyl", i.e., when "L" is methyl.

Diisocyanates that may be used to prepare the aliphatic urethane component of the polymerizable composition include aliphatic diisocyanates, cycloaliphatic diisocyanates and tetramethyl xylene diisocyanate [CAS 2778-41-8]. For convenience and brevity, such isocyanates will be referred to collectively as aliphatic diisocyanates. Such materials are substantially free of isocyanato groups attached directly to aromatic groups. By substantially free of isocyanato groups attached directly to aromatic groups is meant that the aliphatic diisocyanate contains 1 percent or less of diisocyanato groups attached directly to aromatic groups. Thus the aliphatic urethane contains a correspondingly small, if any at all, amount of urethane groups the carbamic nitrogen atoms of which are attached directly to aromatic groups. Examples of suitable diisocyanates include those listed in U.S. Pat. No. 5,221,721 at column 5, lines 34 through 49, which disclosure is incorporated herein by reference.

Polyester diols may be prepared by techniques well known in the art, e.g., using saturated dicarboxylic acids or anhydrides thereof (or combinations of acids and anhydrides) and polyhydric alcohols, or by ring opening of caprolactones, e.g., epsilon caprolactone, with a straight chain glycol, e.g., diethylene glycol. Such polyester diols and their manner of preparation are well known and are fully described in the published literature. Many are commercially available in various molecular weights. Polyhydric alcohols which may be used in the preparation of the polyester diols include those listed and described in U.S. Pat. No. 5,221,721 at column 6, lines 8 through 22, which disclosure is incorporated herein by reference. Examples of polyester diols contemplated for use in preparing aliphatic polyurethane monomers, include those listed and described in U.S. Pat. No. 5,221,721 at column 6, lines 32 through 41, which disclosure is incorporated herein by reference.

Polycarbonate diols that may be used to prepare aliphatic polyurethane monomers are described in column 6, lines 42 through 68 and column 7, lines 1 through 19 of U.S. Pat. No. 5,221,721. Polyether diols, e.g., poly(oxyethylene)glycols, poly(oxy-1,2-propylene)glycols, and poly(oxy-1,2-butylene)glycol, that may be used to prepare aliphatic polyurethane monomers are described in U.S. Pat. No. 5,221,721 at column 7, lines 20 through 47. Alkane diols contemplated for use in preparing aliphatic polyurethane monomers are described in U.S. Pat. No. 5,221,721 at column 7, lines 48 through 54. All of the aforedescribed disclosures are incorporated herein by reference.

Polymerization of the polymerizable organic composition of the present invention may be accomplished by adding to the composition an initiating amount of material capable of generating free radicals, such as organic peroxy compounds, i.e., an initiator. Methods for polymerizing polyol(allyl carbonate) compositions are well known to the skilled artisan and any of those well known techniques may be used to polymerize the aforedescribed polymerizable organic compositions. Suitable examples of organic peroxy compounds, that may be used as initiators include: peroxymonocarbonate esters, such as tertiarybutylperoxy isopropyl carbonate; peroxydicarbonate esters, such as di(2-ethylhexyl) peroxydicarbonate, cyclohexylperoxydicarbonate, di(secondary butyl) peroxydicarbonate and diisopropylperoxydicarbonate; diacyperoxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, acetylcyclohexane sulfonyl peroxide, and azobisisobutyronitrile. Preferred initiators are those that do not discolor the resulting polymerizate. A preferred initiator is diisopropyl peroxydicarbonate.

The amount of initiator used to initiate and polymerize the polymerizable organic compositions of the present invention vary and will depend on the particular initiator used. Only that amount that is required to initiate and sustain the polymerization reaction is required, i.e., an initiating amount. With respect to the preferred peroxy compound, diisopropyl peroxydicarbonate, typically between 2.0 and 5.0 parts of that initiator per 100 parts of the polymerizable organic composition (phm) may be used. More usually, between 2.5 and 4.0 phm is used to initiate the polymerization. The amount of initiator and the consequent cure cycle should be adequate to produce a polymerizate having a 15 second Barcol hardness of at least 1, preferably, at least 4, e.g., from 4 to 35. Typically, the cure cycle involves heating the polymerizable organic composition in the presence of the initiator from room temperature to 85° C. to 125° C. over a period of from 4 hours to 30 hours.

Various conventional additives may be incorporated into the polymerizable organic composition of the present invention. Such additives may include light stabilizers, heat stabilizers, and ultraviolet light absorbers. In addition, it is contemplated that a form of organic photochromic substance resistant to the effects of the initiator may also be added to the polymerizable organic composition of the present invention. Such organic photochromic substances include photochromic pigments and photochromic compounds encapsulated in metal oxides, the latter of which are described in U.S. Pat. Nos. 4,166,043 and 4,367,170.

It is also contemplated that a polymerization moderator may be added to the polymerizable organic composition of the present invention to minimize the formation of distortions, such as striations, in polymerizates obtained therefrom. Suitable polymerization moderators include for example, dilauryl thiodipropionate, terpinolene, 1-isopropyl-4-methyl-1,4-cyclohexadiene, alpha-methyl styrene, 4-tert-butylpyrocatechol, and mixtures thereof. The polymerization moderator may be added to the polymerizable organic composition of the present invention in an amount from 0.01% to 20% by weight, based on the total weight of polymerizable organic composition.

It is further contemplated that a flexibilizing additive having no radically polymerizable groups, henceforth referred to as a nonpolymerizable flexibilizing additive, may be added to polymerizable organic compositions of the present invention. Such a nonpolymerizable flexibilizing additive is different than the aforedescribed first, second and third monomer components. The nonpolymerizable flexibilizing additive, or mixtures of nonpolymerizable flexibilizing additives, may be added in an amount of from 0.05% to 15%, preferably from 0.5% to 10% and more preferably from 2% to 6% by weight, based on the total weight of the monomer components and the weight of the nonpolymerizable flexibilizing additive(s). The nonpolymerizable flexibilizing additive may be used in combination with, the first and second monomer components or the first, second and third monomer components. The nonpolymerizable flexibilizing additive may be nonaromatic or aromatic.

Examples of suitable nonpolymerizable flexibilizing additives include, alkoxylated phenol benzoate, alkoxylated naphthol benzoate, 1,3-bis(phenylthio)propane, bis (phenylthio) alkylene ether, the reaction product of phenyl chloroformate and dimercaptan, the reaction product of dimercaptan and phosgene endcapped with phenol, cinnamates, triphenyl phosphite, tri(2-ethylhexyl) trimellitate, triisodecyl trimellitate, poly(alkylene glycol) dinaphthoate, 2-ethylhexyl diphenylphosphate, isodecyl diphenyl phosphate, tricresyl phosphate, poly(alkylene glycol) dibenzoates, e.g., poly(ethylene glycol) dibenzoate and poly(propylene glycol) dibenzoate, esters of phthalic acid, isophthalic acid, and terephthalic acid, e.g., dioctyl phthalate, and a member represented by the following general formula VI:

VI

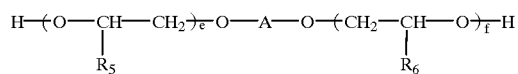

wherein e and f are each a positive number, the sum of e and f being from 0 to 70, $R_5$ and $R_6$ are each hydrogen or $C_1$ to $C_2$ alkyl, preferably hydrogen or methyl and A is a divalent linking group selected from the group consisting of straight or branched chain alkylene (usually containing from 1 to 8 carbon atoms), phenylene, $C_1$–$C_9$ alkyl substituted phenylene and a group represented by general formula III,

III

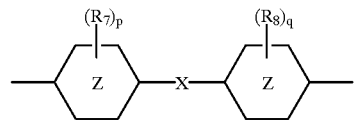

wherein, $R_7$ and $R_8$ are each $C_1$–$C_4$ alkyl, chlorine or bromine, p and q are each an integer from 0 to 4,

represents a divalent benzene group or a divalent cyclohexane group and X is O, S, —S(O$_2$)—, —C(O)—, —CH$_2$—, —C(CH$_3$)$_2$—, —C(CH$_3$)(C$_6$H$_5$)— or

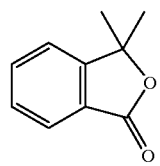

when

is the divalent benzene group, and X is O, S, —CH$_2$—, or —C(CH$_3$)$_2$— when

is the divalent cyclohexane group.

Nonpolymerizable flexibilizing additives, described with reference to general formula VI where the sum of e and f is greater than 0, may be prepared by methods which are well known in the art. One such commonly used method involves reacting a polyol, e.g., 4,4'-isopropylidenediphenol with an oxirane containing substance, e.g., ethylene oxide, propylene oxide, α-butylene oxide or β-buoylene oxide, to form the nonpolymerizable flexibilizing additive represented by general formula VI.

Examples of suitable polyols, for preparing nonpolymerizable flexibilizing additives represented by general formula VI wherein the sum of e and f is greater than 0, or for use as the nonpolymerizable flexibilizing additive wherein the sum of e and f is 0, include those described with respect to the first step of preparing the second monomer component, exclusive of 4,4'-(1,2-ethenediyl)bisphenol.

A preferred nonpolymerizable flexibilizing additive may be defined with reference to general formula VI wherein the sum of e and f is from 25 to 35, $R_5$ and $R_6$ are each hydrogen, and A is a divalent linking group according to general formula III, wherein

represents a divalent benzene group, p and q are each 0 and X is —$C(CH_3)_2$—.

Polymerizates obtained from polymerization of polymerizable organic compositions of the present invention are solid and preferably transparent or optically clear so that they may be used for optical lenses, such as plano and ophthalmic lenses, sun lenses, windows, automotive transparencies, e.g., windshields, T-roofs, sidelights and backlights, and for aircraft transparencies, etc. When used to prepare photochromic articles, e.g., lenses, the polymerizate should be transparent to that portion of the electromagnetic spectrum which activates the photochromic substance(s) incorporated in the matrix, i.e., that wavelength of ultraviolet (UV) light that produces the colored or open form of the photochromic substance and that portion of the visible spectrum that includes the absorption maximum wavelength of the photochromic substance in its UV activated form, i.e., the open form.

Photochromic compounds that may be utilized with the polymerizates of the present invention are organic photochromic compounds or substances containing same that may be incorporated, e.g., dissolved, dispersed or diffused into such polymerizates.

A first group of organic photochromic substances contemplated for use to form the photochromic articles of the present invention are those having an activated absorption maximum within the visible range of greater than 590 nanometers, e.g., between greater than 590 to 700 nanometers. These materials typically exhibit a blue, blueish-green, or blueish-purple color when exposed to ultraviolet light in an appropriate solvent or matrix. Many of such compounds are described in the open literature. For example, spiro(indoline)naphthoxazines have been described, among others, in U.S. Pat. Nos. 3,562,172; 3,578,602; 4,215,010; and 4,342,668. Spiro(indoline)naphthoxazines having certain substituents at the 8' and 9' positions of the naphthoxazine portion of the molecule are described in U.S. Pat. No. 5,405,958. Spiro(indoline)pyridobenzoxazines are described in U.S. Pat. No. 4,637,698. Spiro(benzindoline)pyridobenzoxazines and spiro(benzindoline)naphthoxazines are described in U.S. Pat. No. 4,931,219. Spiro(benzindoline)naphthopyrans are described in Japanese Patent Publication 62/195383. Spiro(indoline)benzoxazines are described in U.S. Pat. No. 4,816,584. Spiro(indoline)benzopyrans, spiro(indoline)naphthopyrans and spiro(indoline)quinopyrans are described, for example, in U.S. 4,880,667. Benzopyrans and naphthopyrans having a nitrogen-containing substituent at the 2-position of the pyran ring are described in U.S. Pat. No. 4,818,096. Spiro(indoline)pyrans are also described in the text, *Techniques in Chemistry*, Volume III, "Photochromism," Chapter 3, Glenn H. Brown, Editor, John Wiley and Sons, Inc., New York, 1971.

A second group of organic photochromic substances contemplated for use to form the photochromic articles of the present invention are those having at least one absorption maximum and preferably two absorption maxima, within the visible range of between 400 and less than 500 nanometers. These materials typically exhibit a yellow-orange color when exposed to ultraviolet light in an appropriate solvent or matrix. Such compounds include certain chromenes, i.e., benzopyrans and naphthopyrans. Many of such chromenes are described in the open literature, e.g., U.S. Pat. Nos. 3,567,605; 4,826,977; 5,066,818; 4,826,977; 5,066,818; 5,466,398; 5,384,077; 5,238,931; and 5,274,132.

A third group of organic photochromic substances contemplated for use to form the photochromic articles of the present invention are those having an absorption maximum within the visible range of between 400 to 500 nanometers and another absorption maximum within the visible range of between 500 to 700 nanometers. These materials typically exhibit color(s) ranging from yellow/brown to purple/gray when exposed to ultraviolet light in an appropriate solvent or matrix. Examples of these substances include certain benzopyran compounds, having substituents at the 2-position of the pyran ring and a substituted or unsubstituted heterocyclic ring, such as a benzothieno or benzofurano ring fused to the benzene portion of the benzopyran. Such materials are the subject of U.S. Pat. No. 5,429,774.

Other photochromic substances contemplated are photochromic organo-metal dithzonates, i.e., (arylazo)thioformic arylhydrazidates, e.g., mercury dithizonates which are described in, for example, U.S. Pat. No. 3,361,706. Fulgides and fulgimides, e.g. the 3-furyl and 3-thienyl fulgides and fulgimides which are described in U.S. Pat. No. 4,931,220 at column 20, line 5 through column 21, line 38.

The disclosures relating to such photochromic compounds in the aforedescribed patents are incorporated herein, in toto, by reference. The photochromic articles of the present invention may contain one photochromic compound or a mixture of photochromic compounds, as desired. Mixtures of photochromic compounds may be used to attain certain activated colors such as a near neutral gray or brown.

Each of the photochromic substances described herein may be used in amounts and in a ratio (when mixtures are used) such that a polymerizate to which the mixture of compounds is applied or in which they are incorporated exhibits a desired resultant color, e.g., a substantially neutral color such as shades of gray or brown when activated with unfiltered sunlight, i.e., as near a neutral color as possible given the colors of the activated photochromic compounds. The relative amounts of the aforesaid photochromic compounds used will vary and depend in part upon the relative intensities of the color of the activated species of such compounds, and the ultimate color desired.

The photochromic compounds or substances described herein may be applied to or incorporated into the polymerizate by various methods described in the art. Such methods include dissolving or dispersing the substance within the polymerizate, e.g., imbibition of the photochromic substance into the polymerizate by immersion of the polymerizate in a hot solution of the photochromic substance or by thermal transfer; providing the photochromic substance as a separate layer between adjacent layers of the polymerizate, e.g., as a part of a polymer film; and applying the photochromic substance as part of a coating placed on the surface of the polymerizate. The term "imbibition" or "imbibe" is intended to mean and include permeation of the photochromic substance alone into the polymerizate, solvent assisted transfer absorption of the photochromic substance into a porous polymer, vapor phase transfer, and other such transfer mechanisms.

The amount of photochromic substance or composition containing same applied to or incorporated into the polymerizate is not critical provided that a sufficient amount is used to produce a photochromic effect discernible to the naked eye upon activation. Generally such amount can be described as a photochromic amount. The particular amount used depends often upon the intensity of color desired upon irradiation thereof and upon the method used to incorporate or apply the photochromic substances. Typically, the more photochromic substance applied or incorporated, the greater is the color intensity. Generally, the amount of total photochromic substance incorporated into or applied to a photochromic optical polymerizate may range from 0.15 to 0.35 milligrams per square centimeter of surface to which the photochromic substance(s) is incorporated or applied.

The present invention is more particularly described in the following examples, which are intended to be illustrative only, since numerous modifications and variations therein will be apparent to those skilled in the art. Unless otherwise specified, all parts and all percentages are by weight.

EXAMPLES 1–2

Table 1 describes two polymerizable monomer compositions. Example 1 is representative of an embodiment of the present invention. Example 2 is a comparative example. The level of diisopropyl peroxydicarbonate used in each of Examples 1 and 2 is selected so that the polymerizates obtained therefrom are substantially completely cured.

TABLE 1

| Basic Ingredients, Parts | Example 1 | Example 2 |
|---|---|---|
| CR-39 ® monomer[a] | 94 | 100 |
| SR-9036 monomer[b] | 6 | 0 |
| Diisopropyl peroxydicarbonate | 3.7 | 3.0 |

[a]CR-39 ® monomer is a diethylene glycol bis(allyl carbonate) monomer obtained from PPG Industries Inc.
[b]SR-9036 monomer, obtained from Sartomer Inc., is a bismethacrylate of ethoxylated 4,4'-isopropylidenediphenol having an average of 30 moles of ethylene oxide.

Cast sheets of the polymerizable monomer compositions of Table 1 were made in the following manner. Each monomer composition was transferred to a suitable vessel and the designated amount of di-isopropyl peroxydicarbonate was added. The resulting initiated polymerizable monomer composition was mixed using a magnetic stir plate and magnetic stir bar at a temperature of 4° C. The initiated monomer composition was then filtered through a 0.45 micron MAGNA nylon filter using a 316 stainless steel 1.5 liter pressure filter holder, under 20 pounds per square inch (138 kPa) of nitrogen gas. The resulting filtered composition was then poured into glass molds having the following interior dimensions, 15.24×15.24×0.32 cm. The filled molds were then placed in a heated water bath and cured using the appropriate cure cycle described in Table 2. The cure cycle used was optimized for each of Examples 1 and 2 so that polymerizates obtained therefrom would be substantially completely cured. Physical properties of the sheets were measured and the results are tabulated in Table 3.

TABLE 2*

| Cure Cycles | |
|---|---|
| Cummulative Hours | Oven Temperature ° C. |
| Cure Cycle For Example 1 | |
| 0 | 39 |
| 2.3 | 41 |
| 8 | 44 |
| 12.5 | 47 |
| 16.5 | 51 |
| 20 | 56 |
| 22 | 68 |
| 24 | 88 |
| 26 | 90 (end of cycle) |
| Cure Cycle For Example 2 | |
| 0 | 39 |
| 8.3 | 55 |
| 10.1 | 58 |
| 11.4 | 63 |
| 13 | 66 |
| 14.5 | 70 |
| 15.2 | 77 |
| 16.5 | 90 |
| 18.5 | 91 (end of cycle) |

*The rate of temperature change represented in Table 2 was, in all instances, linear.

TABLE 3

| | Physical Data | |
|---|---|---|
| Example | 1 | 2 |
| Physical Test | | |
| % Transmitance[c] | 93.7 | 94.0 |
| Yellowness Index[d] | 1.09 | 0.57 |
| L* | 97.51 | 97.62 |
| a* | −0.40 | −0.10 |
| b* | 0.73 | 0.34 |
| Refractive Index[e] ($n_d^{20}$) | 1.4975 | 1.4965 |
| Abbe Number | 55 | 57 |
| Density at 25° C. (g/cc) | 1.299 | 1.316 |
| Physical Test | | |
| Barcol Hardness (0 Seconds)[f] | 9 | 29 |
| Barcol Hardness (15 seconds)[f] | 1 | 23 |
| Heat Distortion Temperature[g] (° C. at 10 mils) | 42 to 44 | 51 to 58 |
| Total Deflection at 130° C.[h] (mils) | 50 to 56 | 36 to 37 |
| Bayer Abrasion Resistance[i] | 0.9 | 1.0 |
| Youngs Modulus (GPa)[j] | 1.68 | 3.00 |

[c]Percent transmittance was determined in accordance with ASTM D 1003, using a Hunter Lab model D25P-9 colorimeter employing a Lumen C light source.
[d]Yellowness Index, L*, a* and b* were determined in accordance with ASTM D 1925-70, using a Hunter Lab model D25P-9 colorimeter employing a Lumen C light source.
[e]Refractive Index $n_d^{20}$ was determined in accordance with ASTM D542-50, using a Bausch & Lomb Abbe-3L refractometer.
[f]Barcol Hardness was determined in accordance with ASTM - D 2583-81, taking scale readings immediately after the Barcol impresser point penetrated the specimen, and 15 seconds thereafter.
[g]The Heat Distortion Temperature was measured, at a deflection of 254 microns (10 mils), in accordance with ASTM D 648-86 using a Custom Scientific Instruments Model HDV3 DTUL/Vicat Softening Point Apparatus.
[h]Total Deflection at 130° C. was determined in accordance with ASTM D 648-86 using a Custom Scientific Instruments Model HDV3 DTUL/Vicat Softening Point Apparatus.

TABLE 3-continued

Physical Data

| Example | 1 | 2 |
|---|---|---|

[i]Bayer Abrasion Resistance was determined in accordance with ASTM F735-81, using an oscillating sand abrasion device. The Bayer Abrasion Resistance results are shown as ratios relative to homopolymers of CR-39 ® monomer as the standard, (result for the sample in question/result for standard). A Bayer Abrasion Resistance value greater than 1.0 indicates that the sample in question has better abrasion resistance relative to a sample prepared from the standard.
[j]Young's Modulus was determined, using a Fischer Scope H-100 instrument, in accordance with the instrument manufacturer's instructions. Smaller Young's Modulus values indicate increased flexibility.

The data of Table 3 shows that polymerizates obtained from polymerizable monomer compositions of the present invention have greater flexibility and essentially equivalent abrasion resistance relative to polymerizates obtained from a homopolymer of CR-39© monomer.

EXAMPLES 3–4

Plano lenses, 12 mm thick, were cast from initiated polymerizable monomer compositions having the same compositions as described in Table 1 using glass plano lens molds having interior dimensions of 75 mm diameter×12 mm, the preparative method described in the previous Example, and the cure cycles described in Table 2. The cast plano lenses were imbibed with a combination of 3,3-di(4-methoxyphenyl)-13-hydroxy-13-(1-methylethyl)—indeno [2,1-f]naphtho[1,2-b]pyran, and 2,2-diphenyl-5-(ethoxycarbonylmethoxy carbonyl)-8-methyl-[2H]-naphtho-[1,2-b] pyran as follows: Resin solutions of the photochromic substances were spin coated onto the convex surfaces of the cast lenses. The coated cast lenses were then allowed to dry under an infrared lamp for 20 minutes followed by heating for 6 hours in a forced air oven set at 135° C. The imbibed lenses were then removed from the oven and allowed to cool to room temperature. The imbibed lenses were then thoroughly washed with 32° C. water to remove the resin solution.

Photochromic performance data for the imbibed cast lenses were determined through use of an optical bench. Prior to testing on the optical bench, the imbibed cast lenses were exposed to 365 nanometer ultraviolet light for about 15 minutes to activate the photochromic compounds and then placed in a 76° C. oven for about 15 minutes to bleach or inactivate the photochromic compounds. The imbibed cast lenses were then cooled to room temperature, exposed to fluorescent room lighting for at least 2 hours and then kept covered for at least 2 hours prior to testing on an optical bench maintained at 23.9° C.

The optical bench was equipped with a 300 watt Xenon arc lamp operated at about 200 watts, a remote controlled shutter, a Schott WG-320 nm cut off filter, which removes short wavelength radiation, neutral density filter(s) and a constant temperature water bath in which the lens to be tested was immersed. A collimated beam of light from a tungsten lamp was passed through the cast lens at a small angle to the normal of the center of the convex side of the plano lens. After passing through the lens, the light from the tungsten lamp impinged a beam splitter which split the beam into two secondary beams of equal intensity. The reflected secondary beam was directed through a 480 nm band pass filter to a detector. The unreflected secondary beam was directed through a 620 nm band pass photopic filter to a detector. The photopic filter passes wavelengths such that the detector mimics the response of the human eye. The output signals from the detector(s) were processed by a radiometer which delivered data to a computer. The following Table 4 lists photochromic performance data obtained from the tested plano lenses.

TABLE 4

Photochromic Performance

| | Example | |
|---|---|---|
| Polymerizable Monomer | 3 | 4 |
| Compositions according to Example | 1 | 2 |
| Test | | |
| Net Absorbance[k] at 390 nm | 1.84 | ND[1] |
| $\Delta$OD[l] 8 minutes, (29.4° C.) | 0.279 | ND |
| B/O Ratio[m] | 1.11 | ND |
| Bleach Half Life $(t_{1/2})$[n] (seconds) | 46 | ND |

[1]ND = Not Determined. Lenses cast according to Example 4 could not be imbibed to any appreciable extent, and as such photochromic performance data relative to Example 4 was not determined.
[k]Net Absorbance at 390 nm, (viz., absorbance of the imbibed lens in the bleached state minus the absorbance of the uncoated lens) was determined at room temperature using a Varian Model Cary 3 spectrophotometer.
[l]Change in optical density ($\Delta$OD) was determined on the optical bench by inserting an imbibed lens, in the bleached state, into the sample holder, adjusting the transmittance scale to 100%, opening the shutter from the Xenon lamp to provide ultraviolet radiation to change the test square from the bleached state to an activated (i.e., substantially darkened) state, measuring the transmittance in the activated state, and calculating the change in optical density according the formula $\Delta$OD = log(100/% Ta) where % Ta is the percent transmittance in the activated state and the logarithm is to the base 10. The period of exposure to the ultraviolet light from the Xenon lamp at the time the percent transmittance is determined, and the temperature of the water bath, are both noted.
[m]The B/O Ratio is a measure of the optical density at 570 nm over the optical density at 470 nm. The respective optical density values were determined using the optical bench as described above.
[n]The Bleach Half Life $(T_{1/2})$ is the time interval in seconds for the absorbance of the activated form of the imbibed lens to reach one half the highest absorbance at 29.4° C. after removal of the source of activating light.

The data of Table 4 shows that photochromic articles made from polymerizates of the present invention may be successfully imbibed with photochromic substances to produce articles that have good photochromic performance properties compared to polymerizates prepared from homopolymers of CR-39© monomer.

The present invention has been described with reference to specific details of particular embodiments thereof. It is not intended that such details be regarded as limitations upon the scope of the invention except insofar as and to the extent that they are included in the accompanying claims.

We claim:

1. A polymerizable organic composition comprising:

(a) a major amount of a first monomer component represented by the following general formula,

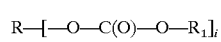

wherein R is a radical derived from a polyol, $R_1$ is a radical derived from an allyl or substituted allyl group and i is a whole number from 2 to 6; and (b) from 2% to 35% by weight, based on the total weight of monomer components, of a second monomer component represented by the following general formula,

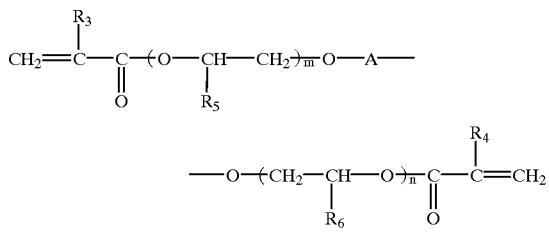

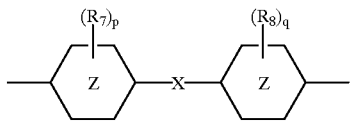

wherein m and n are each a positive number, the sum of m and n being from 5 to 70, $R_3$ and $R_4$ are each hydrogen or methyl, $R_5$ and $R_6$ are each hydrogen or $C_1$ to $C_2$ alkyl, and A is a divalent linking group selected from the group consisting of straight or branched chain alkylene, phenylene, $C_1$–$C_9$ alkyl substituted phenylene, and a group represented by the following general formula,

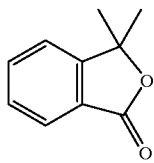

wherein, $R_7$ and $R_8$ are each $C_1$–$C_4$ alkyl, chlorine or bromine, p and q are each an integer from 0 to 4,

represents a divalent benzene group or a divalent cyclohexane group and X is O, s, —S($O_2$)—, —C(O)—, —$CH_2$—, —CH=CH—, —C($CH_3$)$_2$—, —C($CH_3$)($C_6H_5$)— or

when

is the divalent benzene group, and X is O, S, —$CH_2$—, or —C($CH_3$)$_2$— when

is the divalent cyclohexane group.

2. The polymerizable organic composition of claim 1 wherein the polyol from which R is derived is a poly($c_2$–$C_4$) alkylene glycol or 4,4'-isopropylidenediphenol, i is 2, the sum of m and n is from 10 to 40, and A is a divalent linking group represented by the following general formula,

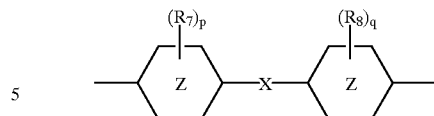

wherein

represents a divalent benzene group.

3. The polymerizable organic composition of claim 2 wherein the polyol from which R is derived is diethylene glycol, $R_1$ is the allyl group, the sum of m and n is from 25 to 35, $R_3$ and $R_4$ are each methyl, $R_5$ and $R_6$ are each hydrogen, p and q are each 0, and X is —C($CH_3$)$_2$—.

4. The polymerizable organic composition of claim 3 wherein the second monomer component is present in an amount of from 2% to 15% by weight.

5. The polymerizable organic composition of claim 1 further comprising from 0.5% to 30% by weight, based on the total weight of monomer components, of a third monomer component having ethylenic unsaturation and being polymerizable by free radical initiation, said third monomer component being different from said first and second monomer components.

6. The polymerizable organic composition of claim 5 wherein the third monomer component is selected from the group consisting of methyl methacrylate, vinyl acetate, triallyl cyanurate, pentaerythritol tetraacrylate, and mixtures thereof.

7. The polymerizable organic composition of claim 5 wherein the third monomer component is an aliphatic polyurethane monomer having terminal unsaturated groups selected from acrylyl, methacrylyl and allyl groups, and mixtures of such unsaturated groups.

8. The polymerizable organic composition of claim 1 further comprising a nonpolymerizable flexibilizing additive in an amount of from 0.05% to 15% by weight, based on the total weight of monomer components and said nonpolymerizable flexibilizing additive.

9. The polymerizable organic composition of claim 8 wherein said nonpolymerizable flexibilizing additive is selected from the group consisting of poly(alkylene glycol) dibenzoate, esters of phthalic acid, esters of isophthalic acid, esters of terephthalic acid and a member represented by the following general formula,

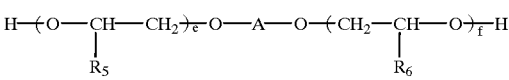

wherein e and f are each a positive number, the sum of e and f being from 0 to 70, $R_5$ and $R_6$ are each hydrogen or $C_1$ to $C_2$ alkyl, and A is a divalent linking group selected from the group consisting of straight or branched chain alkylene, phenylene, $C_1$–$C_9$ alkyl substituted phenylene and a group represented by the following general formula,

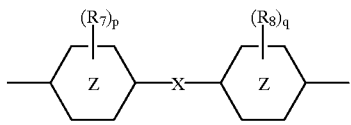

wherein, $R_7$ and $R_8$ are each $C_1$–$C_4$ alkyl, chlorine or bromine, p and q are each an integer from 0 to 4,

represents a divalent benzene group or a divalent cyclohexane group and X is O, S, —S($O_2$)—, —C(O)—, —$CH_2$—, —C($CH_3$)$_2$—, —C($CH_3$)($C_6H_5$)— or

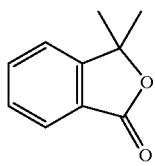

when

is the divalent benzene group, and X is O, S, —$CH_2$—, or —C($CH_3$)$_2$— when

is the divalent cyclohexane group.

10. The polymerizable organic composition of claim 5 further comprising a nonpolymerizable flexibilizing additive in an amount of from 0.05% to 15% by weight, based on the total weight of monomer components and said nonpolymerizable flexibilizing additive.

11. The polymerizable organic composition of claim 10 wherein said nonpolymerizable flexibilizing additive is selected from the group consisting of poly(alkylene glycol) dibenzoate, esters of phthalic acid, esters of isophthalic acid, esters of terephthalic acid and a group represented by the following general formula,

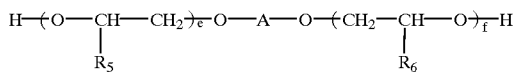

wherein e and f are each a positive number, the sum of e and f being from 0 to 70, $R_5$ and $R_6$ are each hydrogen or $C_1$ to $C_2$ alkyl, and A is a divalent linking group selected from the group consisting of straight or branched chain alkylene, phenylene, $C_1$–$C_9$ alkyl substituted phenylene and a group represented by the following general formula,

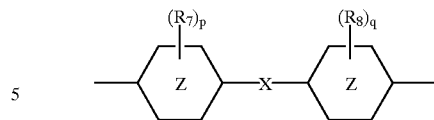

wherein, $R_7$ and $R_8$ are each $C_1$–$C_4$ alkyl, chlorine or bromine, p and q are each an integer from 0 to 4,

represents a divalent benzene group or a divalent cyclohexane group and is O, S, —S($O_2$)—, —C(O)—, —$CH_2$—, —C($CH_3$)$_2$—, —C($CH_3$)($C_6H_5$)— or

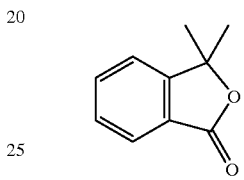

when

is the divalent benzene group, and X is O, S, —$CH_2$—, or —C($CH_3$)$_2$— when

is the divalent cyclohexane group.

12. The polymerizate of claim 1.
13. The polymerizate of claim 4.
14. The polymerizate of claim 5.
15. The polymerizate of claim 8.
16. The polymerizate of claim 10.
17. A photochromic article comprising:
    (a) the polymerizate of claim 12; and
    (b) a photochromic amount of organic photochromic substance.
18. A photochromic article comprising:
    (a) the polymerizate of claim 13; and
    (b) a photochromic amount of organic photochromic substance.
19. The photochromic article of claim 18 wherein the organic photochromic substance is selected from the group consisting of spiro(indoline)naphthoxazines, spiro(indoline)benzoxazines, benzopyrans, naphthopyrans, chromenes, organo-metal dithizonates, fulgides and fulgimides and mixtures of such organic photochromic substances.
20. A photochromic article comprising:
    (a) the polymerizate of claim 14; and
    (b) a photochromic amount of organic photochromic substance.

21. A photochromic article comprising:
(a) the polymerizate of claim 15; and
(b) a photochromic amount of organic photochromic substance.

22. A photochromic article comprising:
(a) the polymerizate of claim 16; and
(b) a photochromic amount of organic photochromic substance.

* * * * *

UNITED STATES PATENT AND TRADEMARK OFFICE
CERTIFICATE OF CORRECTION

PATENT NO. : 5,973,093
DATED : October 26, 1999
INVENTOR(S) : Randy E. Daughenbaugh et al.

It is certified that error appears in the above-identified patent and that said Letters Patent is hereby corrected as shown below:

Column 17, claim 1,
Line 26, "s" should be -- S --.

Column 20, claim 11,
Line 16, "and is O," should be -- and X is O, --.

Signed and Sealed this

Twenty-fifth Day of December, 2001

Attest:

Attesting Officer

JAMES E. ROGAN
Director of the United States Patent and Trademark Office